United States Patent
Furuta et al.

(10) Patent No.: US 8,148,000 B2
(45) Date of Patent: Apr. 3, 2012

(54) POWER TOOL AND PROTECTOR FOR POWER TOOL

(75) Inventors: Takefumi Furuta, Anjo (JP); Munetoshi Goto, Anjo (JP); Shinsuke Okuda, Anjo (JP)

(73) Assignee: Makita Corporation, Anjo-shi (JP)

( * ) Notice: Subject to any disclaimer, the term of this patent is extended or adjusted under 35 U.S.C. 154(b) by 1269 days.

(21) Appl. No.: 11/882,392

(22) Filed: Aug. 1, 2007

(65) Prior Publication Data

US 2008/0032190 A1    Feb. 7, 2008

(30) Foreign Application Priority Data

Aug. 4, 2006   (JP) ................................ 2006-212785

(51) Int. Cl.
*H01M 2/10* (2006.01)
*H01M 2/00* (2006.01)
*B65H 1/00* (2006.01)
*B65D 85/00* (2006.01)

(52) U.S. Cl. .......... 429/96; 429/100; 429/163; 221/282; 206/703

(58) Field of Classification Search ............ 429/96, 429/100, 163; 221/282; 206/703
See application file for complete search history.

(56) References Cited

U.S. PATENT DOCUMENTS

| D106,423 S * | 10/1937 | Brodeen ................ D13/119 |
| 5,401,591 A | 3/1995 | Bishay et al. |
| 5,769,657 A * | 6/1998 | Kondo et al. ............ 439/500 |
| 6,279,741 B1 | 8/2001 | Arvin |
| D615,926 S * | 5/2010 | Uneo et al. ............. D13/119 |
| 2005/0058890 A1* | 3/2005 | Brazell et al. ............. 429/99 |
| 2008/0036420 A1* | 2/2008 | Zeiler et al. ............. 320/107 |

FOREIGN PATENT DOCUMENTS

| DE | 201 17 889 U1 | 1/2002 |
| EP | 1 516 702 A2 | 3/2005 |
| JP | Y2-7-44462 | 10/1995 |

* cited by examiner

*Primary Examiner* — Lore Jarrett
(74) *Attorney, Agent, or Firm* — Oliff & Berridge, PLC (57) ABSTRACT

It is an object of the invention to provide a technique to further increase protection performance for a battery pack of power tool. A representative power tool may include a tool body to which a tool bit is coupled to perform a predetermined operation, a driving motor that is disposed within the tool body, a battery pack that supplies driving current to the driving motor, the battery pack being removably mounted to the tool body and placed on the outside of the tool body in an exposed state, and a protector that is removably mounted to the tool body to protect the battery pack. The protector may include a battery pack protection area that protects the battery pack mounted to the tool body when the protector is mounted to the tool body. The battery pack protection area is dosed on at least part of the outer surface of the battery pack with a clearance and prevents transmission of external force upon the battery pack protection area to the battery pack.

9 Claims, 5 Drawing Sheets

POWER TOOL AND PROTECTOR FOR POWER TOOL

BACKGROUND OF THE INVENTION

1. Field of the Invention

The present invention relates to a battery-powered power tool and more particularly, to a technique for protecting a battery pack of the power tool.

2. Description of the Related Art

A known battery-powered power tool is provided with a protective provision to protect a battery pack against impact when the power tool is struck against something or dropped during use or carry. Such a power tool is disclosed, for example, in EP 1516702. According to the known art a cushioning protection member mainly comprising an elastic element is directly provided on the battery pack itself and protects the battery pack against impact. However, a cushioning member as a protective member is directly mounted in the known art, sufficient impact absorbing effectiveness cannot be obtained.

SUMMARY OF THE INVENTION

Accordingly, it is an object of the invention to provide a technique to further increase protection performance for a battery pack of power tool.

The above-described object can be achieved by a claimed invention. According to the invention, a representative power tool includes a tool body to which a tool bit is coupled, a driving motor disposed within the tool body, and a battery pack that supplies driving current to the driving motor. The battery pack is removably mounted to the tool body and placed on the outside of the tool body in an exposed state.

The representative power tool includes a protector that is removably mounted to the tool body and protects the battery pack. The protector is provided as a kind of adapter. The protector includes a battery pack protection area that protects the battery pack mounted to the tool body when the protector is mounted to the tool body. The battery pack protection area is disposed on at least part of the outer surface of the battery pack with a clearance therebetween and prevents an external force upon the battery pack protection area from being transmitted to the battery pack. The battery pack protection area may typically include a frame member that is disposed to cover the outer surface of the battery pack at least in part or in entirety This frame member may be preferably formed by rigid metal sheet, or by an elastic element (rubber molding) into which a sheet metal is inserted, or by a resin molding into which a sheet metal is inserted.

According to the invention, the protector is provided with the battery pack protection area which is spaced apart from the associated outer surface of the battery pack. With this construction, when the power tool is struck against something or dropped on the ground during use or carry, the external force such as impact force upon the battery pack protection area of the protector is prevented from being transmitted to the battery pack. Thus, the battery pack can be effectively protected against external forces.

Further, because the protector is removably mounted to the tool body, only the protector can be replaced with a new one if the protector is broke. Further, depending on the operation modes of the power tool, the processing operation can be performed with the protector being removed from the power tool.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and protectors and method for using such power tools, protectors and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
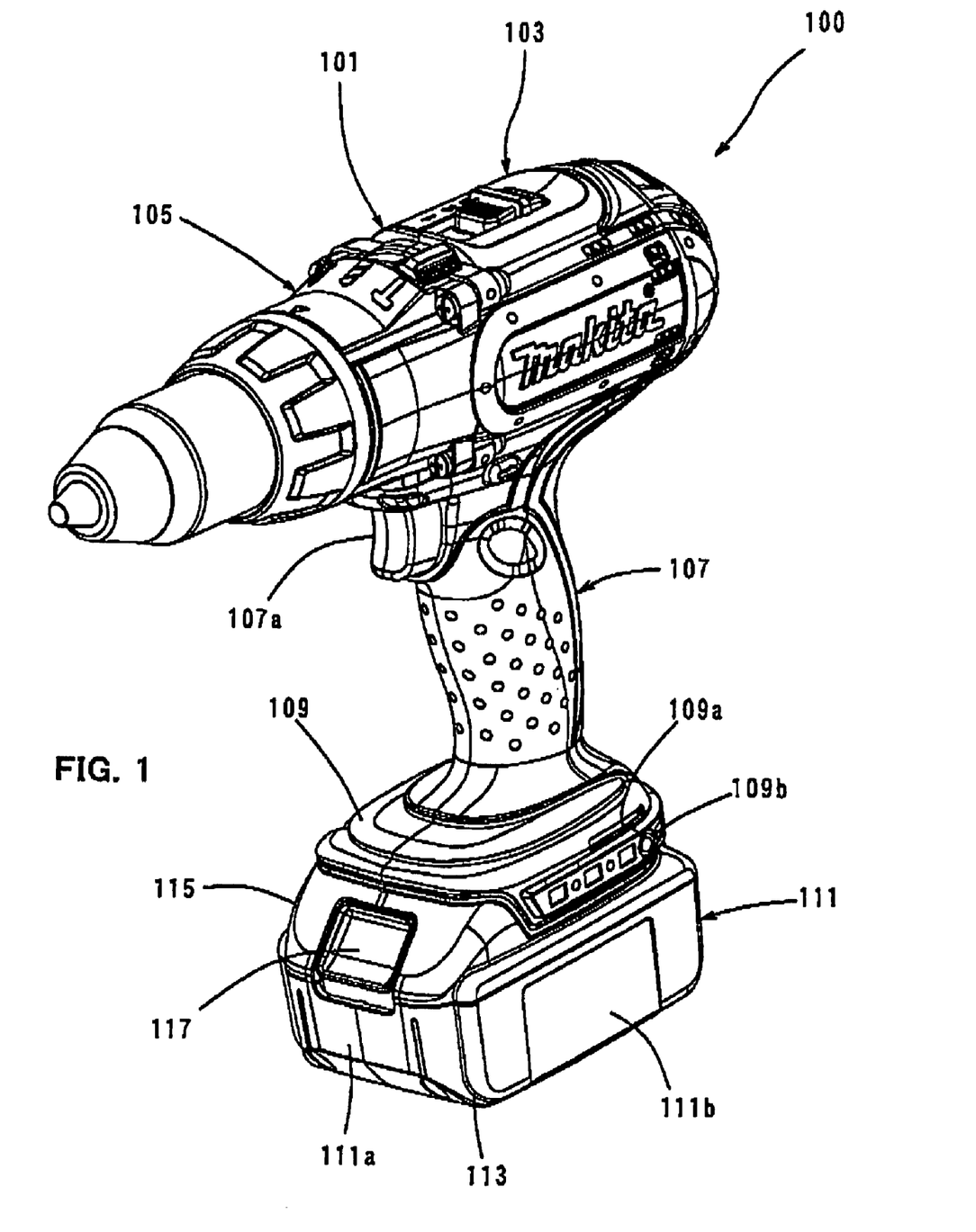
FIG. 1 is a perspective view showing a rechargeable vibration driver drill in its entirety according to an embodiment of the present invention.

A first representative embodiment of the present invention is now described with reference to the drawings. FIG. 1 is a perspective, external view showing a rechargeable vibration driver drill 100, which is used for screw-tightening and drilling operations, as a representative example of a power tool according to the embodiment of the present invention. As shown in FIG. 1, the representative rechargeable vibration driver drill 100 includes a body 101 and a driver bit which performs a screw-tightening operation of tightening various kinds of screws or a drill bit for drilling operation (which is not shown). The driver bit or drill bit is detachably coupled to the tip end region of the body 101. The body 101 and the driver bit or drill bit are the features that correspond to the "tool body" and the "tool bit", respectively, according to this invention. In the description hereinafter, for the sake of explanation, the tip end side (bit side) of the body 101 is taken as the front side, and the opposite side as the rear side.

The body 101 includes a motor housing 103, a gear housing 105 and a handgrip 107. The motor housing 103 houses a driving motor (not shown) that drives a bit. A trigger 107a for actuating a power switch of the driving motor is mounted on the handgrip 107. The gear housing 105 houses a power transmitting mechanism (not shown) for transmitting the rotating output of the driving motor.

The vibration driver drill 100 is T-shape with the handgrip 107 extending from generally the middle of the body 101 in its longitudinal direction and extending downward in a direction that intersects with the longitudinal direction of the body 101. A battery holder 109 is formed on the lower end or extending end of the handgrip 107. The battery holder 109 has a predetermined plane area wider than the sectional area of the handgrip 107.

A battery pack 111 for supplying driving current to the driving motor is mounted on the underside of the battery holder 109. The handgrip 107 and the battery holder 109 are the features that correspond to the "grip" and the "extending end", respectively, according to this invention. The battery pack 111 includes a battery case 113 having a generally rectangular, open-topped box-like shape, a plurality of cells (not shown) housed in the battery case 113, and a removable battery cover 115 for covering the open top of the battery case 113.

The battery pack 111 is detachably mounted to the battery holder 109 by sliding the battery pack 111 horizontally in the longitudinal direction of the body 101. For this purpose, a mounting guide (not shown) is provided on the top of the battery pack 111 or on the battery cover 115, and a locking device (not shown) is provided on the inner surface of the battery cover 115. The mounting guide serves as a means for guiding the battery pack 111 to be slid backward from the front of the battery holder 109 so as to be mounted onto the battery holder 109 and also serves as a means for preventing the battery pack 111 from falling off the battery holder 109.

The locking device includes a hook provided on the battery pack 111 and an engagement portion formed on the battery holder 109. The locking device locks the battery pack 111 by engagement of the hook and the engagement portion when the battery pack 111 is slid from before backward and mounted on the battery holder 109. Thus, the battery pack 111 is prevented from sliding forward (in the direction of removal) and becoming detached from the battery holder 109.

The hook is configured to constantly apply a biasing force of a spring in the direction of engagement. A lock release lever 117 is disposed on a front 111a of the battery pack 111 (the front of the battery cover 115) and can be pressed from the outside to release the lock of the locking device. The lock release lever 117 is a feature that corresponds to the "operating part" according to the present invention. The battery pack 111 attached to the battery holder 109 is kept exposed on the outside of the body 103, except its upper surface or mounting surface for mounting to the battery holder 109.

Figure 2:
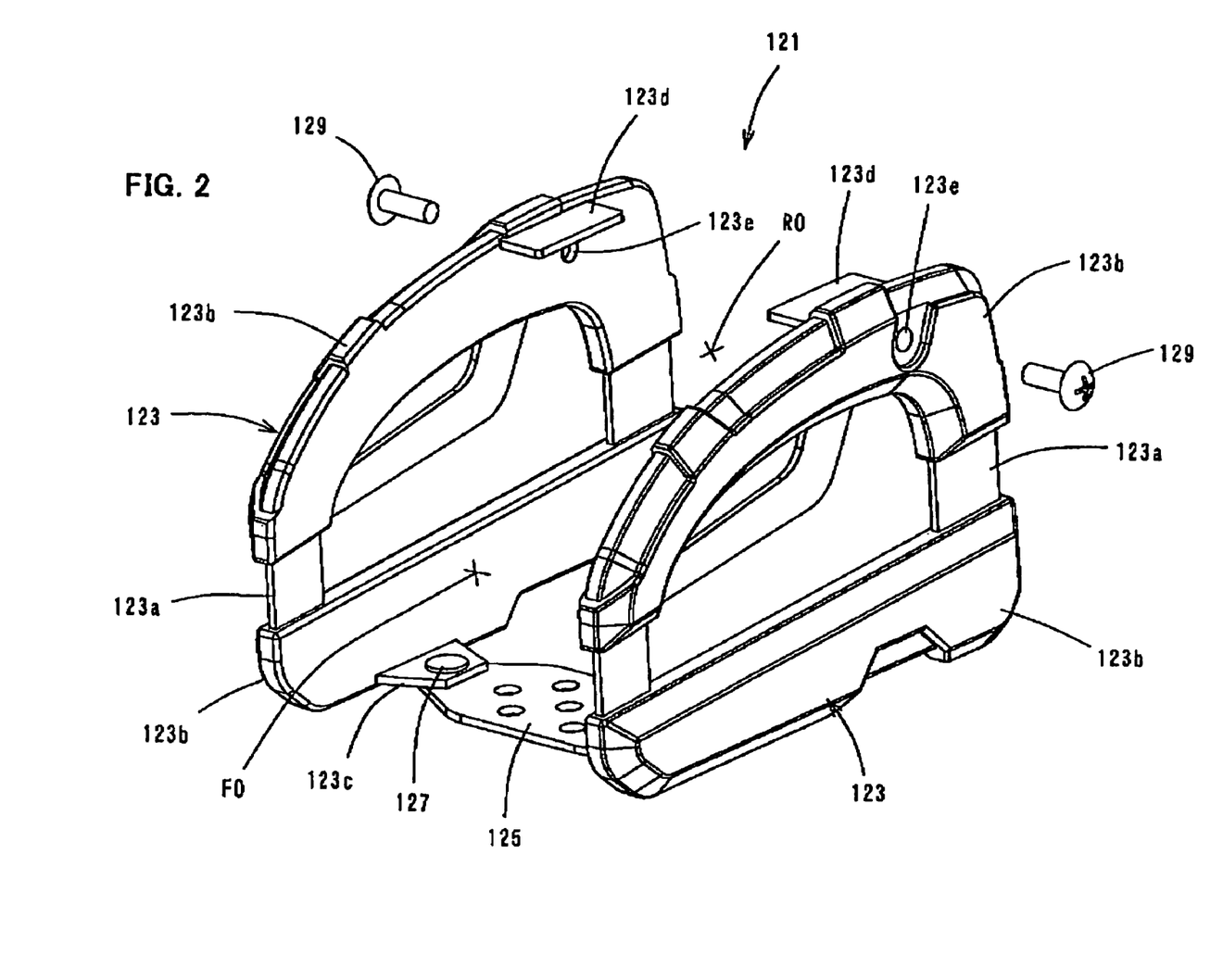
FIG. 2 is a perspective view showing a first embodiment of a battery protector in its entirety.
Figure 3:
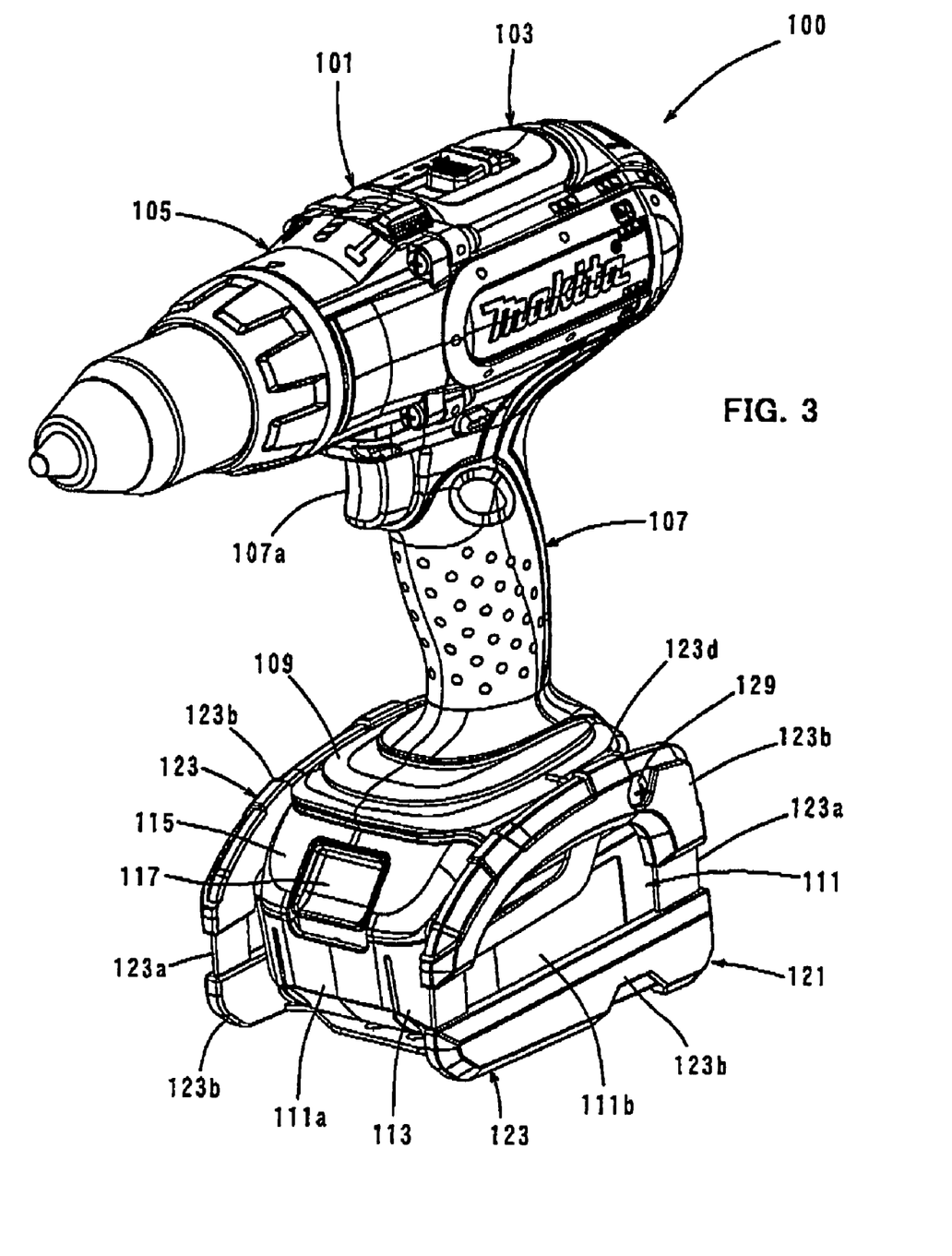
FIG. 3 is a perspective view of the vibration driver drill, as viewed from the front, to which the battery protector is mounted.
Figure 4:
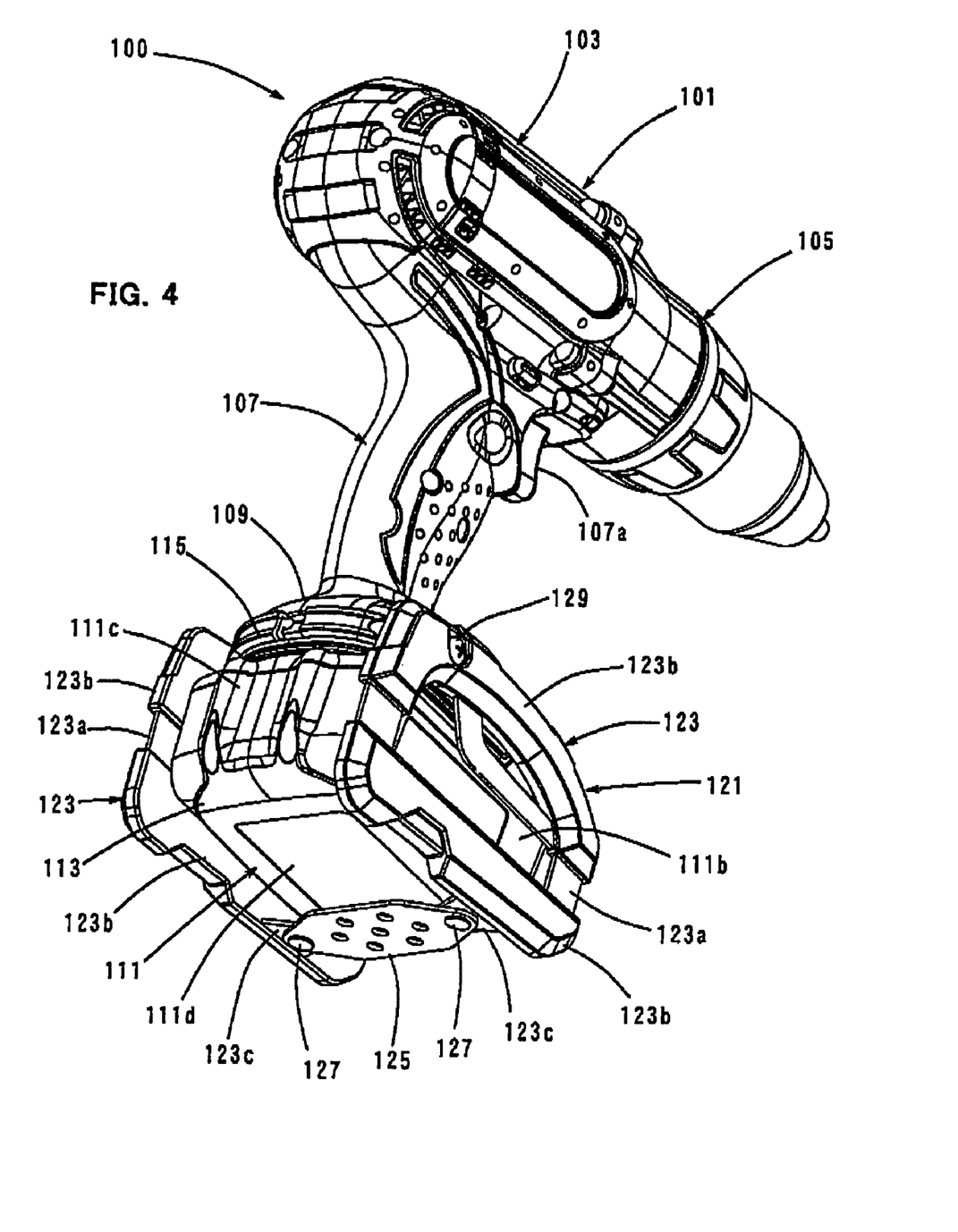
FIG. 4 is also a perspective view of the vibration driver drill, as viewed from the back to which the battery protector is mounted.

A battery protector 121 for protecting the battery pack 111 mounted on the battery holder 109 is now explained in detail with reference to FIGS. 2 to 4. The battery protector 121 is a feature that corresponds to the "protector" according to the present invention. FIG. 2 is a perspective view showing the entire battery protector 121. FIGS. 3 and 4 show the battery protector 121 attached to the vibration driver drill 100. The battery protector 121 is removably mounted to the battery holder 109, and the mounting structure for mounting the battery protector will be described below.

As shown in FIG. 2, the battery protector 121 according to this embodiment is generally U-shaped as viewed from the front, including a pair of right and left side frames 123 extending in the longitudinal direction of the body 101 and a connecting plate 125 that connects the side frames 123 on the bottom side. Thus, the battery protector 121 has a frame structure having open front, back and top and closed sides and bottom. The side flames 123 and the connecting plate 125 are features that correspond to the "batter pack protection area" according to the preset invention. Each of the side franc 123 includes a rigid element 123a made of sheet metal and an elastically deformable elastic element 123b made of synthetic rubber. The rigid element 123a has a generally rectangular frame-like shape having an opening in the center, as viewed from the side. The elastic element 123b covers upper and lower frame regions of the rigid element 123a and is formed by insert molding. Each of the side frames 123 is higher in the vertical direction and longer in the longitudinal direction than the battery pack 111.

A protruding piece 123c is integrally formed on the lower frame portion of each of the rigid elements 123a and extends horizontally inward from the front region (in the longitudinal direction) of the lower frame portion. The connecting plate 125 of sheet metal is rotatably connected to the protruding piece 123c by a connecting pin 127. Thus, when the battery protector 121 is mounted to and removed from the battery holder 109, the distance between the side frames 123 on the rear side can be changed by rotating the side frames 123 horizontally on the connecting pin 127.

Next, the mounting structure for mounting the battery protector 121 to the battery holder 109 is explained. As shown in FIG. 1, a slit-like engagement groove 109a is formed in a rear portion of each of the right and left sides of the battery holder 109 and extends horizontally in the longitudinal direction. Further, a mounting portion 109b having a screw hole is formed slightly below the engagement groove 109a. The engagement groove 109a and the mounting portion 109b are provided as a mounting portion for mounting existing attachments, namely a hook (not shown) which is used to hook the vibration driver drill 100 onto a waist belt of the user, or a bit holder (not shown) for holding spare driver bits. In this embodiment, this mounting portion is utilized to mount the battery protector 121. This mounting portion is a feature that corresponds to the "mounting portion" according to the present invention.

As shown in FIG. 2, an engagement piece 123d is integrally formed on the upper frame portion of the rigid element 123a of each of the side frames 123 and extends horizontally inward from the rear region (in the longitudinal direction) of the upper frame portion. Further, a mounting hole 123e is formed slightly below the engagement piece 123d and extends through the upper frame portion in the lateral direction. The right and left engagement pieces 123d are inserted into the associated engagement grooves 109a of the battery holder 109 and thereby serve as a means for positioning and temporarily fixing the battery protector 121 to the battery holder 109 when the battery protector 121 is mounted to the battery holder 109.

The battery protector 121 having the above-described construction is mounted to the battery holder 109 in the following procedures. First, the side frames 123 are rotated on the connecting pin 127 in a direction that increases the distance between the side frames 123 on the rear side. In this state, the side frames 123 are then positioned to face the sides 111b of the battery pack 111. Thereafter, the side frames 123 are rotated back on the connecting pin 127 in a direction that decreases the distance between the side frames 123 on the rear side. In this manner, the engagement pieces 123d are fitted into the associated engagement grooves 109a of the battery holder 109. Thus, the battery protector 121 is positioned and temporarily fixed to the battery holder 109. In this state, the mounting screws 129 are passed trough the mounting holes 123e and driven into the screw holes of the protector mounting portions 109b. Thus, the battery protector 121 can be mounted to the battery holder 109. Further, the battery protector 121 can be removed from the battery holder 109 by reversing the above-described mounting procedure.

FIGS. 3 and 4 show the battery protector 121 attached to the battery holder 109. In the attached state, the inner faces of the side frame 123 of the battery protector 121 are located along the associated sides 111b of the battery pack 111 with a clearance therebetween. Further, the upper face of the connecting plate 125 is located under a bottom 111d of the battery pack 111 with a clearance therebetween.

The front end portions of the side frames 123 protrude a predetermined distance forward from the front 111a of the battery pack 111, and the rear end portions of the side frames 123 protrude a predetermined distance rearward from a back 111c of the battery pack 111. Further, the lower end portions of the side frames 123 protrude a predetermined distance downward from the bottom 111d of the battery pack 111. A front portion of the protector 121 which faces the front 111a of the battery pack 111 on which the lock release lever 117 is mounted and a rear portion of the protector 121 which faces the back 111c of the battery pack 111 are open. Thus, the user's fingers holding the battery pack 111 can pass through the open front and rear portions together with the battery pack 111 when the battery pack 111 is attached to and removed from the battery holder 109. In FIG. 2, the open front portion and the open rear portion are designated by symbols "FO" and "RO", respectively.

With this construction, when removing the battery pack 111 from the battery holder 109 in order, for example, to charge the battery pack 111, the user insert the thumb into the open front portion FO and the other fingers into the open rear portion RO. Then, the lock release lever 117 is pressed with the thumb in order to release the lock of the battery pack 111 by the lock device with respect to the battery holder 109. In this state, the battery pack 111 is slid forward while holding the back 111c of the battery pack 111 with the fingers other than the thumb. Thus, the battery pack 111 can be removed from the battery holder 109 via the open front portion FO of the battery protector 121 without interfering with the battery protector 121.

When the battery pack 111 is in a position a predetermined distance away from its mounting position, the lock device is kept in the lock-released state even if the lock release lever 117 is released. Therefore, it is not necessary to keep pressing the lock release lever 117 until the battery pack is completely removed. Thus the user is allowed to once release the fingers from the battery pack 111 and then hold it again in the process of its removal. In this embodiment, when the battery pack 111 is removed, the fingers other than the thumb are initially placed to cross the connecting plate 125. However, for the above-mentioned reason, the fingers can be released from the battery pack 111 and then held again in the process of its removal. Further, the battery pack 111 can be attached to the battery holder 109 by reversing the above-described removing procedure.

Thus, according to this embodiment, with the construction of the battery protector 121 having the open front and rear portions FO, RO, the battery protector 121 can be left attached to the battery holder 109 while the battery pack 111 is attached to and removed from the battery holder 109. The open front and rear portions FO, RO of the battery protector 121 are features that correspond to the "open region" according to the present invention.

As described above, the vibration driver drill 100 according to this embodiment is provided with the battery protector 121 for protecting the battery pack 111. The inner faces of the right and left side frames 123 of the battery protector 121 are located along the associated sides 111b of the battery pack 111 with a clearance of certain distances. Further, the front, rear and lower end portions of the side frames 123 protrude outward from the front 111a, the back 111c and the bottom 111d of the battery pack 111, respectively. Therefore, if, for example, the vibration driver drill 100 is dropped on the ground during use or carry, either one or both of the frames 123 hit the ground, so that not only the sides 111b but also the front 111a, the back 111c and the bottom 111d of the battery protector 121 can be protected from directly hitting the ground. Specifically, even with the battery protector 121 having the open front and rear portions, the same protective effect can be obtained as a construction in which the entire outside surface of the battery pack 111 is covered.

Further, the side frames 123 are spaced apart from the associated sides 111b of the battery pack 111. Therefore, an external force (impact force) upon the side frames 123 can be prevented from being transmitted to the battery pack 111. Thus, according to this embodiment, the battery protector 121 can effectively protect the battery pack 111 against impact when the vibration driver drill 100 is dropped or struck against something during use or carry.

Further, the rigid element 123a made of sheet metal and the elastic element 123b covering the rigid element 123a form each of the side frames 123. Therefore, the side forms 123 are capable of cushioning the impact of hitting the ground or any other object while maintaining a predetermined rigidity. Thus, the protection performance for protecting the battery pack 111 can be further improved.

Further, in this embodiment, the battery protector 121 can be removably attached to the battery holder 109 formed on the tool body side. Therefore, in contrast to the construction in which a cushioning element is directly provided on the battery pack 111, if the battery protector 121 is broken, only the broken battery protector 121 can be replaced with a new one, and thus the whole battery pack itself need not be replaced with a new one.

Further, the engagement groove 109a and the mounting portion 109b of the battery holder 109 form a mounting portion for mounting attachments, namely a hook or a bit holder. In this embodiment, the existing mounting portion is utilized to mount the battery protector 121. Specifically, each of the side frames 123 of the battery protector 121 is formed with the engagement piece 123d that can be engaged in the engagement groove 109a and the mounting hole 123e for the mounting screw 129, so that the battery protector 121 can be attached to the battery holder 109. Thus, the mounting structure for the battery protector 121 can be efficiently provided. Further, either the attachment or the battery protector 121 can be selectively mounted to the attachment mounting portion.

Further, the side frames 123 can be rotated horizontally on the connecting pin 127, so that the distance between the side frames 123 on the side of the engagement pieces 123d can be increased or decreased. With this construction, the engagement pieces 123d can be easily engaged in or disengaged from the engagement grooves 109a when the battery protector 121 is attached to or removed from the battery holder 109. Therefore, this construction is effective in work simplification of mounting and removing the battery protector 121.

Further, the battery protector 121 is generally U-shaped as viewed from the front, including a pair of right and left side frames 123 extending in the longitudinal direction of the body 101 and a connecting plate 125 that connects the side frames 123 on the bottom side. Thus, the battery protector 121 is configured to have open front and back located in the direction of attachment and removal of the battery pack 111. With this configuration, the battery protector 121 can be left attached to the battery holder 109 while the battery pack 111 is attached to and removed from the battery holder 109.

Therefore, ease of operation of mounting and removing the battery pack 111 can be improved.

Second Representative Embodiment

Figure 5:
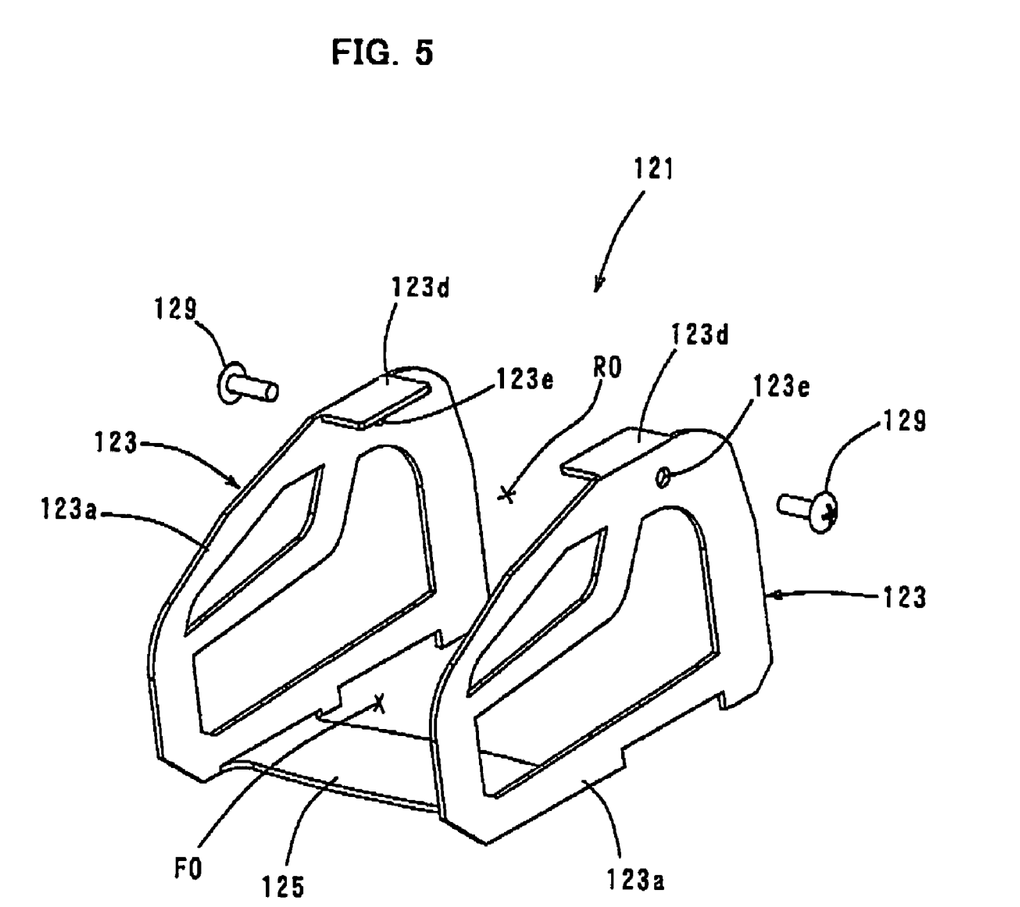
FIG. 5 is a perspective view showing a second embodiment of the battery protector in its entirety.

Next, the battery protector 121 according to a second representative embodiment is now explained with reference to FIG. 5. In the battery protector 121 of this embodiment, each of the right and left side frames 123 is formed by only the rigid element 123a of the metal sheet. Further, the connecting plate 125 is integrally formed with the side frames 123 and extends between the lower frame portions of the side frames 123. Thus, the side flames 123 are connected to each other by the connecting plate 125. Further, like in the first embodiment the engagement piece 123d and the mounting hole 123e for mounting the battery protector 121 to the battery holder 109 are formed in the upper frame portion of each of the side frames 123.

In order to mount the battery protector 121 having the above-described construction to the battery holder 109, like in the first representative embodiment, the engagement pieces 123d are engaged in the associated engagement groove 109a which are formed in the battery holder 109 on the lower end of the handgrip 107, and the mounting screws 129 are inserted through the mounting holes 123e and driven into the screw holes of the mounting portions 109b. The distance between the upper frame portions of the side fines 123 can be increased such that the upper frame portions are moved away from each other by utilizing the elastic deformation of the connecting plate 125. Therefore, the engagement pieces 123d can be inserted into and removed from the associated engagement groove 109a without any trouble.

Further, the battery protector 121 is positioned and temporarily fixed to the battery holder 109 by the engagement pieces 123d, so that the screw-tightening operation by using the mounting screws 129 can be facilitated. Further, the battery protector 121 is manufactured from only the rigid element 123a or metal sheet. This is effective in realizing simplification of the structure and weigh reduction while ensuring a predetermined rigidity, and also in reduction of the manufacturing costs.

In the first and second representative embodiments as described above, the power tool is described as being of the slide type in which the battery pack 111 is mounted to and removed from the battery holder 109 by moving in a direction that intersects with the extending direction of the handgrip 107. However, this invention can also be applied to a power tool of an insertion type in which the battery pack is mounted and removed by moving the battery pack 111 in the extending direction of the handgrip 107.

In the insertion type the battery pack 111 is attached or removed in the vertical direction. Therefore, the battery protector 121 for protecting the insertion-type battery pack has an open side that faces one side (for example, the front) of the outer surface of the battery pack 111 on which at least the lock release lever 117 of the locking device that locks the batty pack 111 to the battery holder 109 is provided. The battery protector 121 also has another open side which faces the bottom of the battery pack 111 in the direction of removal of the battery pack 111. On the sides other than the two open sides of the battery protector 121, frame portions am provided as a battery pack protection area. With such construction, the battery protector 121 can be left attached to the battery holder 109 while the user operates the lock release lever 117 in order to allow removal of the battery pack and then withdraws the battery pack 111 while holding the front and the back of the battery pack 111 by the fingers inserted through the open sides. The battery pack 111 can also be mounted while the battery protector 121 is left attached to the battery holder 109.

Further, in the above-described embodiments, the user operates the lock release lever 117 with the finger to allow the battery pack 111 to be removed, and while keeping this state, the user holds the battery pack 111 and leaves the battery pack 111 from the battery holder 109. In this process, the fingers holding the battery pack 111 are placed to cross the connecting plate 125. However, by appropriately changing the configuration of the battery pack protection area and the open area of the battery protector 121, the battery protector 121 may be configured such that the fingers holding the battery pack 111 are not placed to cross the connecting plate 125, or specifically such that the fingers can be passed though the open area without interference (without need of holding the battery pack 111 again after once released).

Further, in the representative embodiment, the construction in which the side frames 123 rotate horizontally via the connecting pins 127 may be changed into the construction as described in the second embodiment in which the side frames 123 are integrally formed with the connecting plate 125. Further, the mounting sore for mounting the battery protector 121 to the battery holder 109 may be changed to a different one from that shown in the drawings. Further, the side frames 123 may be changed to a construction not having an opening in the center, such as a construction in which a flat plate forms the side frames 123 and entirely covers the side surfaces of the battery pack 111. Further, in this embodiment, the rechargeable vibration driver drill 100 is described as a representative example of the power tool, but it is not limited to the vibration driver drill 100. The present invention can be widely applied to any rechargeable power tools having a battery pack mounted externally in an exposed state.

Description of Numerals 100 vibration driver drill (power tool)
101 body (tool body)
103 motor housing
105 gear housing
107 handgrip (grip)
107a trigger
109 battery holder
109a engagement groove
109b mounting portion
111 battery pack
111a front
111b side
111c back
111d bottom
113 battery case
115 battery cover
117 lock release lever (operating portion)
121 battery protector (protector)
123 side frame (battery-pack protection area)
123a rigid element
123b elastic element
123c protruding piece
123d engagement piece
123e mounting hole
125 connecting plate
127 connecting pin
129 mounting screw
FO open font portion (open area)
RO open rear portion (open area)

What is claimed is:

1. A power tool comprising:
   a tool body to which a tool bit is coupled to perform a predetermined operation,
   a driving motor that is disposed within the tool body,
   a battery pack that supplies driving current to the driving motor, the battery pack being removably mounted to the tool body and placed on the outside of the tool body in an exposed state, and
   a protector that is removably mounted to the tool body to protect the battery pack, wherein:
   the protector includes a battery pack protection area that protects the battery pack mounted to the tool body when the protector is mounted to the tool body, and
   the battery pack protection area is disposed on at least part of the outer surface of the battery pack with a clearance and prevents transmission of external force upon the battery pack protection area to the battery pack.

2. The power tool as defined in claim 1, wherein the tool body includes a mounting portion for removably mounting an attachment that is provided as an aid in the operation of the tool bit, and either the protector or the attachment is selectively mounted to the mounting portion.

3. The power tool as defied in claim 1 wherein:
   the tool body includes a grip extending in a direction that intersects with the longitudinal direction of the tool body,
   the battery pack can be mounted to and removed from an extending end of the grip by moving the battery pack in a direction that intersects with the extending direction of the grip or in the extending direction of the grip,
   the battery pack includes an operating portion that is operated in order to allow the battery pack to be removed from the extending end of the grip,
   the protector includes an open area through which the battery pack is allowed to pass without interfering with the protector, when a user removes the battery pack from the extending end of the grip by holding the battery pack and moving the battery pack in the direction that intersects with the extending direction of the grip or in the extending direction of the grip, while operating the operating portion by the finger to allow removal of the battery pack and keeping the removal allowed state, and
   the battery protection area is provided in an area other than the open area.

4. The power tool as defined in claims 1, wherein an elastic element is provided at least in part of the battery pack protection area.

5. The power tool as defined in claim 1, wherein:
   the tool body includes a mounting portion for removably mounting an attachment that is provided as an aid in the operation of the tool bit, and either the protector or the attachment is selectively mounted to the mounting portion,
   the mounting portion includes an engagement groove and a mounting portion having a screw hole,
   the protector includes a mounting hole and an engagement piece which can be inserted into and removed from the engagement groove, and
   the protector is fastened, with the engagement piece being inserted into the engagement groove, by a mounting screw passed through the mounting hole and driven into the screw hole.

6. The power tool as defined in claim 1, wherein the battery pack protection area includes right and left side frames extending along the sides of the battery pack in the longitudinal direction and a connecting plate that connects the side frames on the bottom side, whereby the protector has a frame structure having open top, front and back.

7. A protector for a power tool that includes a
   a tool body to which a tool bit is coupled to perform a predetermined operation,
   a driving motor that is disposed within the tool body and drives the tool bit, and
   a battery pack that supplies driving current to the driving motor, the battery pack being removably mounted to the tool body and placed on the outside of the tool body in an exposed state, the protector being removably mounted to the tool body for protecting the battery pack,
   the protector comprising a battery pack protection area that protects the battery pack mounted to the tool body when the protector is mounted to the tool body,
   wherein the battery pack protection area is disposed on at least part of the outer surface of the battery pack with a clearance and prevents transmission of external force upon the battery pack protection area to the battery pack.

8. The protector as defined in claim 7, wherein an elastic element is provided at least in part of the battery pack protection area.

9. The protector as defined in claim 7, wherein a front end portion of a side frame of the protector protrudes forward from the front of the battery pack, and a rear end portion of the side frame of the protector protrudes rearward from the back of the battery pack.

* * * * *